M. H. MEAD.
MOUNT FOR SPECIMENS.
APPLICATION FILED MAY 21, 1913.
1,090,403.
Patented Mar. 17, 1914.
2 SHEETS—SHEET 1.
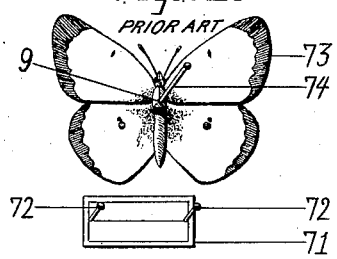
Fig. 3ᵃ. PRIOR ART
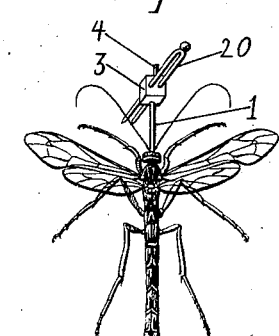
Fig. 7.
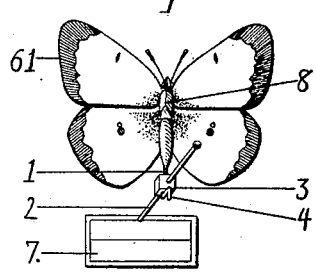
Fig. 3.
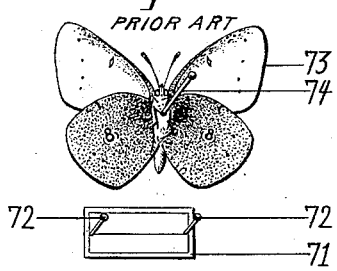
Fig. 4ᵃ. PRIOR ART
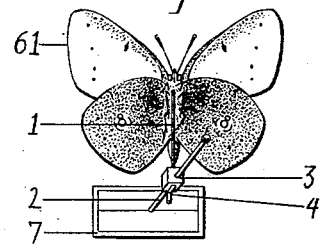
Fig. 4.
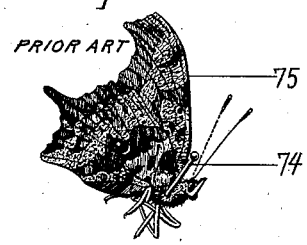
Fig. 5ᵃ. PRIOR ART
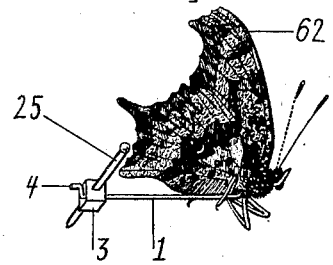
Fig. 5.
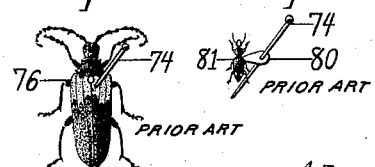
Fig. 6ᵃ. PRIOR ART    Fig. 8ᶜ. PRIOR ART
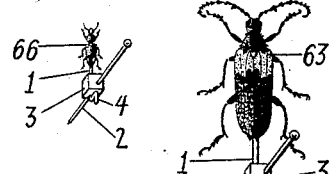
Fig. 8ᵇ.    Fig. 6.
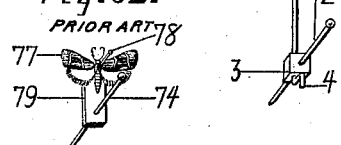
Fig. 8ᵃ. PRIOR ART    Fig. 2.
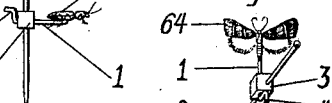
Fig. 8ᵈ.    Fig. 8.
Fig. 1.
WITNESSES:
Christine Davel
Magdalena Bäuerle
INVENTOR,
Marvin H. Mead,
BY
Alexander C. Proudfit
ATTORNEY.

M. H. MEAD.
MOUNT FOR SPECIMENS.
APPLICATION FILED MAY 21, 1913.
1,090,403.
Patented Mar. 17, 1914.
2 SHEETS—SHEET 2.
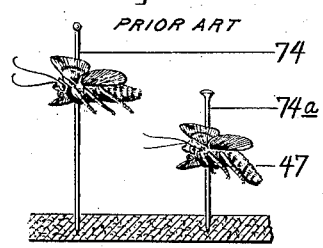
Fig. 9a.
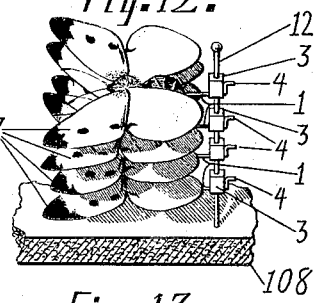
Fig. 12.
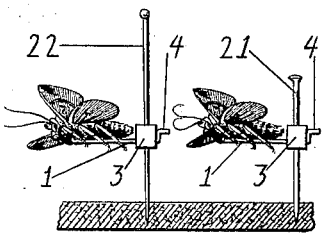
Fig. 9.
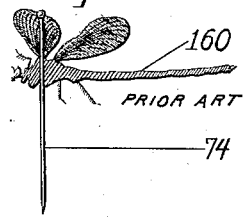
Fig. 10a.
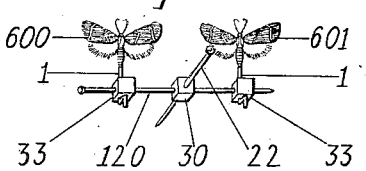
Fig. 13.
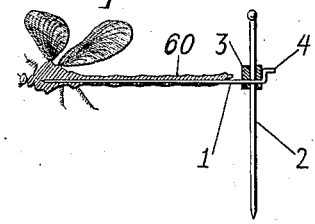
Fig. 10.
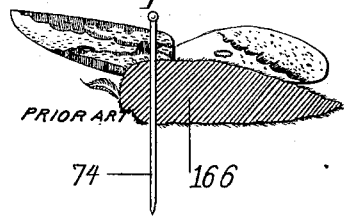
Fig. 11a.    Fig. 11b.
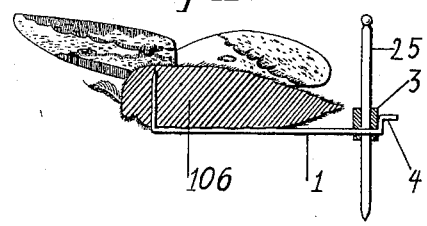
Fig. 11.
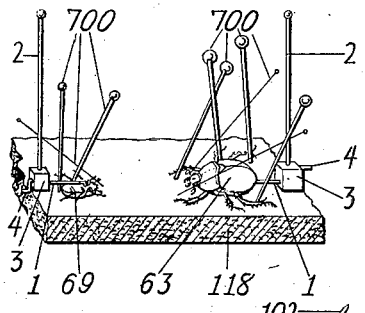
Fig. 16.
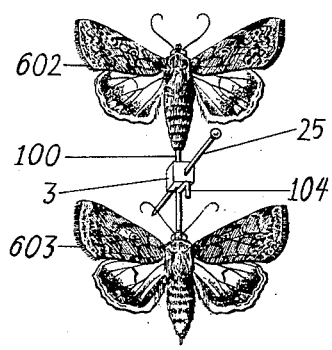
Fig. 14.
Fig. 15.
WITNESSES:
Christine Dauel
Magdalena Bäuerle
INVENTOR,
Marvin H. Mead,
BY
Alexander C. Proudfit,
ATTORNEY.

UNITED STATES PATENT OFFICE.

MARVIN H. MEAD, OF PASSAIC, NEW JERSEY.

MOUNT FOR SPECIMENS.

1,090,403.  Specification of Letters Patent.  Patented Mar. 17, 1914.

Application filed May 21, 1913. Serial No. 769,011.

*To all whom it may concern:*

Be it known that I, MARVIN H. MEAD, of Passaic, New Jersey, have invented certain Improvements in Mounts for Specimens, of which the following description, in connection with the accompanying drawings, is a specification, like letters on the drawings designating like parts.

This invention relates to mounts for specimens, and is of special utility when embodied in mounts for entomological exhibits in museums and private collections, although I contemplate the utilization of my improvements in any field for which they are adapted by their nature.

An important object of my invention is to provide a support upon which such an object as an insect can be readily turned to expose all parts of its surface for inspection.
Another object is to provide supporting means that will engage the specimen in a manner and at a region that will cause minimum injury thereto, and will constitute the minimum of obstruction to a complete survey of the article supported.

Among other objects of my invention is the provision of a support substantially universal in adjustment, and one by means of which a plurality of specimens can be mounted on a single main support in the area ordinarily occupied by one specimen.

Several thousand specimens can thus be made conveniently accessible in an area of a square yard, where ordinarily only a few hundred specimens could be mounted by the apparatus at present used in museums and for transportation, throughout the world, such apparatus consisting essentially of a pin thrust vertically through the thorax of the insects into the bottom of the case inclosing the specimens, which are usually impaled immovably, with some of their most interesting parts invisible, and often injured irreparably.

Still other objects of my invention comprise the provision of means to support the bodies of exceptionally long insects in such a manner that they will not be deformed by their own weight or by accidental contacts; also means to support pairs of specimens side by side, independently rotatable, for comparison; also means to support pairs of specimens in tandem relation on the same supporting member, rotatable collectively for inspection simultaneously of like surfaces; and means for holding the mounts during adjustment of the specimens and supporting members.

Another important object of my invention is to provide means for so fixing the labels, usually furnished for description of specimens, that they will be secured by one of the supporting members without requiring extra label pins, and without having the specimen in position to conceal the legend on the label.

In carrying my invention into effect, I prefer to provide a main supporting member, which may conveniently take the form of a rotatable pin or shaft with a point to enter the body of the insect from the posterior portion, or from beneath; also a secondary supporting member to enter the base, and which may be substantially like the ordinary entomologist's pin; and, intermediate these supporting members, a connecting member, as for example a cube of elastic material, such as cork, transfixed by the supporting members respectively at the angle which will present the specimen in the desired position for observation, and will permit rotation of the specimen by turning or otherwise shifting the supporting members in their assembled relation, the grip of the connecting member serving to maintain the members and the specimen in adjusted position.

The various features of my invention will be illustrated and described fully in the accompanying drawings and specification and pointed out in the claims.

In the drawings, Figure 1 is a view in perspective of a mount in the construction of which my invention has been embodied, with a specimen shown in place thereon; Fig. 2 shows in perspective a modified form of the mount shown in Fig. 1, without a specimen; Figs. 3 and 4 are views, respectively in perspective, of a specimen upon a mount of the type shown in Fig. 2, with the thorax of the specimen upward in Fig. 3 and the mesosternum upward in Fig. 4, while Figs. 3ª and 4ª are respectively views of two separate specimens mounted in accordance with existing practice, the labels being shown mounted separately, as usual; Fig. 5 shows in perspective a butterfly mounted with wings folded, upon a mount of the type shown in Fig. 2, while Fig. 5ª shows a similar specimen as usually mounted when the wings are folded; Fig. 6 is a view similar to Fig. 3, but showing a beetle on the mount; while Fig. 6ª illustrates a similar beetle mounted in the usual manner; in Fig. 7 is shown another modification, with an ichneumon fly in place upon the mount; Fig. 8 is a view similar to Fig. 1 showing the adaptation of my novel form of mount to the support of relatively small insects, as compared with the usual mount, shown in Fig. 8ª; Fig. 8ᵇ shows in perspective a very small beetle, on a mount of the Fig. 2 type, and Fig. 8ᶜ shows a similar beetle as mounted at the present day; while Fig. 8ᵈ is a view in side elevation of the mounted specimen of Fig. 8ᵇ; Fig. 9 shows in side elevation two specimens mounted on pins of different lengths but at the same height according to my improvements, and Fig. 9ª is a similar view of like specimens as usually mounted; Fig. 10 shows in longitudinal section a dragon fly having its body transfixed longitudinally by the support of my improved type, in contra-distinction to the transverse fixure usually adopted as shown in Fig. 10ª; Fig. 11 is a view similar to Fig. 10 of another specimen of considerable size mounted upon one of my supporting pins of modified structure, and illustrates the support of the body of the specimen, in contra-distinction to the usual type of pin shown in Fig. 11ª; Fig. 11ᵇ is a section (larger) of the upright pin; Fig. 12 shows in perspective a mount provided with supports with several specimens superimposed one above the other; and Fig. 13 shows another mount with a plurality of specimens mounted side by side; Fig. 14 shows still another modification, the mount being adapted to support the specimens in tandem relation; Fig. 15 shows in perspective, separately, the mount illustrated in Fig. 14; Fig. 16 is a view in perspective illustrating the manner in which specimens may be prepared in place upon the mount.

In the embodiment of my invention selected for illustration and description to enable ready and complete understanding of my improvements, the part designated by the reference numeral 1 constitutes the primary supporting member, to be engaged directly with, and to support, the specimen, while 2 and 25 designate the secondary supporting member, to be engaged with, and supported by, a suitable base, represented in the drawings by the sheets on which the drawings are made, and 3 designates a connecting member, intermediate the primary and secondary supporting members, and which preferably serves, in accordance with an important feature of my invention, to permit universal adjustment of the supporting members relatively to each other, and of the specimen relatively to the base.

The supporting and connecting members may be of any suitable form and material to accomplish the purpose of my invention, and in the instance selected for illustration and description, I have shown the primary supporting member 1 in the form of a pin or pointed shaft, while the secondary supporting member 2 is shown as a pin of the type used ordinarily by entomologists; and the connecting member 3 may conveniently take the form of a small cube of suitable material, such as cork, through which are thrust the supporting members, at any angle suitable to secure the desired position of the specimen.

The primary supporting member 1 may have a handle, or crank as shown at 4, for the sake of convenience in turning it, and if desired the supporting member may also have an attaching device such as indicated at 5 in Fig. 2, the attaching device there shown, by way of example, taking the form of a point bent at an angle to the pin 1, with which it may be integral. In Figs. 1 and 10, however, the supporting member 1 is shown as straight and pointed to enter the body of the relatively thin specimens 6 and 60 respectively, these being insects with long bodies, in the instances illustrated. So also if desired, the secondary supporting member may be double as shown at 20 in Fig. 7, to lend additional stability, or the pin may be flattened as shown at 25 in Figs. 1, 5, 6, 11, 11ᵇ, 14 and 15.

The connecting member 3 may be arranged at any height upon the secondary supporting member 2, and when made of such material as cork, the contractile quality of the material serves to retain the members in adjusted position, both with respect to the height of the connecting member upon the secondary supporting member, and with respect to the rotative position of the primary supporting member 1, with its specimen. For example, with reference to Figs. 3 and 4, a supporting member 1 of the type shown separately in Fig. 2 is illustrated as a mount for a butterfly 61, which is shown in Fig. 3 in its normal position, with wings extended, and is shown in the reverse position in Fig. 4, the change in position being secured by turning the crank 4, and the specimen will remain in either of the positions illustrated as long as desired, and may be turned from one position to the other without the necessity for handling the specimen. One specimen thus serves the purpose for which ordinarily two specimens, and double the space, are required when mounted in the usual way, as illustrated in Figs. 3ª and 4ª where two specimens 73, similar to the specimen 61, are illustrated, the former in the natural position, and the latter in the reverse position, each transfixed by the usual mounting pin 74. Furthermore, by the use of a primary supporting member of my improved type, the thorax is left unmarred as shown at 8 in Fig. 3, whereas the damage occasioned by fixure in the form illustrated at 9 in Fig. 3ª is irreparable.

In Fig. 3 I have shown at 7 a label secured to the base by transfixing it with the secondary member 2 which leaves it in position to expose clearly whatever legend it may carry, whereas with the usual mount 74, it is necessary to provide separate fastening means 72 for the label 71, as the latter would be hidden by the body of the specimen if secured to the base by the usual pin 74.

Another important object of my invention, secured by the use of the supporting member 1 shown in Fig. 2 is to permit a specimen such as that designated by 62 in Fig. 5 to be mounted in adjustable position, this specimen comprising a butterfly with folded wings, which can be exposed on either side by turning the crank 4. In Fig. 5ª I have shown at 75 a similar specimen transfixed in usual manner by a pin 74, which does not permit any adjustment, and which mars one of the most interesting portions of the specimen, and also prevents the wings from being spread.

In each of the above illustrations of my improvements, the appearance of the specimens is more natural and life-like than when mounted according to the usual practice. This is also true with respect to the specimen illustrated in Fig. 6 at 63, which designates a beetle, as compared with the similar specimen 76, illustrated in Fig. 6ª, transfixed as usual through the wing sheath, by a pin 74, the specimens comprising beetles in both instances. The difference in convenience and appearance is even more marked when the specimens are relatively small, as for example the insect 64 shown in Fig. 8, as compared with the similar insect 77 shown in Fig. 8ª transfixed by a pin 78 thrust into a block 79 transfixed in turn by the usual pin 74. So also with respect to the beetle 66 shown in Fig. 8ᵇ, upon my improved mount, as compared in Fig. 8ᶜ with a similar beetle 81 secured by adhesive upon a small point 80 made of cardboard or celluloid, transfixed by the usual pin 74, as such small beetles are frequently mounted at the present day; and again with respect to the beetle 65 shown in Fig. 8ᵈ upon my improved mount.

As already indicated, my improved mount permits the use of secondary supporting members of different heights as shown at 21 and 22 in Fig. 9, without the usual necessity for mounting the specimens at different heights, as shown in Fig. 8ª with the ordinary pins 74 and 74ª transfixing the specimens. The specimen 47 shown in Fig. 9ª with its body sagging downward, indicates also a defect in the usual method which is overcome by the horizontal form of supporting member at 1 in Fig. 9, which serves to support the body in natural horizontal position.

My improved mount can be used with the short pins employed in some countries, and as well with the long pins used in other countries, and thus uniformity can be secured by individual collectors without damage to the specimens.

In Fig. 10, to which brief reference has been made already, the specimen 60 is shown as supported solidly throughout its extent, whereas the specimen 160 shown in Fig. 10ª is quite unsupported laterally, when transfixed by the usual pin 74, and so is subject to deformation by any accidental contact. This change is further illustrated in Fig. 11 where an insect 106, of relatively large mass, is supported firmly by the member 1, while in Fig. 11ª a similar specimen 166 is quite unsupported for the bulk of its extent by the pin 74.

Fig. 12 illustrates a single secondary supporting member 12 provided with a series of four primary supporting members 1, secured thereto by connecting members 3 of the type already described, and each provided with a specimen 107. By this arrangement I accomplish a highly important object of my invention, which is to save space by permitting a series of specimens to be arranged in vertical alinement above the base 108.

Frequently it is desired to mount similar specimens side by side for convenience and comparison, and this purpose can be served readily as shown in Fig. 13 by providing an auxiliary supporting member 120 transfixing a connecting member 30 on the secondary supporting member 22, while the specimens 600 and 601 are mounted upon the usual primary supporting members 1, the latter being connected by members 33 adjustably upon the auxiliary supporting member 120.

Instead of supporting the specimens side by side as shown in Fig. 13, it may be desired to support them in tandem relation as illustrated in Fig. 14 where the specimens 602 and 603 are so mounted upon a primary supporting member 100, the latter being of special shape as shown in Fig. 15, having preferably an upturned point 101 and another upturned point 102 at its opposite ends, with a crank 104 adjacent to my regular connecting member 3 by which it is secured to the secondary supporting pin 25.

In Fig. 16 I have shown the beetle 63 at the right-hand side in course of preparation upon its supporting member 1, the secondary supporting member 2 being thrust through the connecting member 3 into the base 118 to permit the spreading-pins 700 to be applied in the usual fashion, until the specimen is fixed and dried, after which the connecting member 3 can be elevated, without disturbing the supporting member 2. At the left-hand of Fig. 16 a similar beetle at 69 is shown in reverse position with the preparing pins 700 applied thereto as already described.

Referring again to Fig. 4, it will be noted that the outline of the moth in this position can be readily traced on paper if the member 3 be moved down to the base of the pin 2.

Having illustrated and described my invention thus fully, and means by which the same may be carried into effect, I wish it to be understood that I do not limit myself to the specific materials nor to the forms of construction selected for illustration and description by way of example, nor in general do I limit myself otherwise than as set forth in the claims, read in connection with this specification.

What I claim as new and desire to secure by Letters Patent of the United States of America is:

1. A mount for articles of the class described; said mount comprising means to support a specimen rotatably about a longitudinal axis, substantially as described.

2. A mount for articles of the class described; said mount comprising means to support a specimen rotatably about a longitudinal axis, and means to turn said support about said axis; substantially as described.

3. A mount for articles of the class described; comprising a primary supporting member provided with holding means to engage a specimen; a secondary supporting member carrying said primary member; and means to permit rotation of said primary member and specimen about their longitudinal axis.

4. A mount of the class described; said mount comprising a pin to be fixed upright in a base, and constituting a secondary supporting member; a primary supporting device arranged transversely of said upright pin and provided with holding means for a specimen; and means to permit said upright pin to carry said transverse device rotatably about the longitudinal axis of the latter for exposure of different portions of said specimen.

5. A mount of the class described; comprising a pin having an angularly arranged prong to enter a specimen, and means to support said specimen-holding pin for rotation about the longitudinal axis of said pin to expose different portions of said specimen.

6. A mount of the class described; comprising a primary supporting member having a specimen-receiving prong near one end and a crank-portion; a secondary supporting member; and a connecting member transfixed by said supporting members respectively.

7. A mount of the class described; comprising a rotatable primary supporting member with a plurality of specimen-receiving prongs and a crank-portion; a secondary supporting member; and a connecting member transfixed by said supporting members respectively.

8. A mount of the class described; comprising a primary supporting pin; a secondary supporting pin; and an intermediate connecting member; said instrumentalities coöperating substantially as described.

9. A mount of the class described; comprising a primary supporting pin; a secondary supporting pin; and a block of material transfixable by said pins respectively, constituting a connecting member; said instrumentalities coöperating substantially as described.

10. A mount of the class described; comprising a primary supporting pin; a secondary supporting pin; and a block of cork transfixable by said pins respectively, constituting a connecting member; said instrumentalities coöperating substantially as described.

11. A mount of the class described; said mount comprising a primary supporting member; a secondary supporting member; and a connecting member transfixed by said secondary supporting member, the latter being constructed and arranged to prevent movement of said connecting member around the axis of said secondary supporting member.

12. A mount of the class described; said mount comprising a primary supporting member; a secondary supporting member; and a connecting member transfixed by said secondary supporting member, the latter being of non-circular section to prevent movement of said connecting member around the axis of said secondary supporting member.

13. A mount of the class described; said mount comprising a primary supporting member having a portion to extend along the specimen to support the latter, and having an angularly disposed attaching portion to be engaged with said specimen, substantially as described.

14. A mount of the class described; said mount comprising a primary supporting pin having its shank disposed horizontally to receive and support the body of an insect against injury by jarring; an upright secondary supporting pin; and a connecting member.

15. A mount of the class described; said mount comprising a primary supporting pin; a secondary supporting pin having a point to enter a base; and a connecting member transfixed by said supporting pins respectively and in which said primary pin may be turned to expose either side upward, said connecting member being movable downward toward said base to present said specimen in position to have its outline traced thereupon.

16. A mount of the class described; said mount comprising a primary supporting member to receive and support a specimen rotatably about a longitudinal axis; and a secondary supporting member carrying said primary member and serving as means to affix a label to the supporting base with its legend exposed to view.

Signed at Passaic, in the county of Passaic and State of New Jersey this fourteenth day of May, 1913.

MARVIN H. MEAD.

Witnesses:
ALEXANDER C. PROUDFIT,
ELIAS MEAD.

Copies of this patent may be obtained for five cents each, by addressing the "Commissioner of Patents, Washington, D. C."